US010429672B2

(12) United States Patent
Curley et al.

(10) Patent No.: US 10,429,672 B2
(45) Date of Patent: *Oct. 1, 2019

(54) TEMPORARY CORRECTIVE OPTICAL LENSES

(71) Applicant: E. Thomas Curley, New Albany, OH (US)

(72) Inventors: E. Thomas Curley, New Albany, OH (US); Michael D. Triplett, New Albany, OH (US); Venkatesh Ganapathy, New Albany, OH (US)

(73) Assignee: E. Thomas Curley, New Albany, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/887,163

(22) Filed: Feb. 2, 2018

(65) Prior Publication Data

US 2018/0157065 A1 Jun. 7, 2018

Related U.S. Application Data

(63) Continuation of application No. 15/055,098, filed on Feb. 26, 2016, now Pat. No. 9,915,830, which is a continuation-in-part of application No. 14/453,288, filed on Aug. 6, 2014, now abandoned.

(60) Provisional application No. 61/927,177, filed on Jan. 14, 2014, provisional application No. 61/862,785, filed on Aug. 6, 2013.

(51) Int. Cl.
*G02C 7/02* (2006.01)
*G02C 7/08* (2006.01)
*G02C 9/00* (2006.01)

(52) U.S. Cl.
CPC .............. *G02C 7/086* (2013.01); *G02C 9/00* (2013.01)

(58) Field of Classification Search
CPC . G02C 7/086; G02C 9/00; G02C 9/04; G02C 2200/02
USPC ........................................... 351/57
See application file for complete search history.

(56) References Cited

U.S. PATENT DOCUMENTS

| | | | | |
|---|---|---|---|---|
| 3,628,854 A | * | 12/1971 | Jampolsky | G02C 5/001 351/159.58 |
| 7,036,929 B1 | * | 5/2006 | Harvey | G02C 5/126 351/159.02 |
| 2011/0181828 A1 | * | 7/2011 | Yi | G02C 7/08 351/47 |

* cited by examiner

*Primary Examiner* — William R Alexander
*Assistant Examiner* — Henry A Duong
(74) *Attorney, Agent, or Firm* — Frost Brown Todd LLC

(57) ABSTRACT

An optical device that includes at least one temporary corrective optical lens adapted to be attachable to and detachable from a non-corrective optical lens, wherein the at least one corrective lens further comprises at least one thermoplastic polymer having vision correcting or magnifying properties; and at least one non-phthalate plasticizer blended with the at least one thermoplastic polymer, wherein the corrective optical lens is attachable to the non-corrective optical lens by utilizing inherent van der Waals forces of attraction occurring between the corrective optical lens and the non-corrective optical lens, and wherein the inherent van der Waals forces of attraction are enhanced by blending the at least one non-phthalate plasticizer with the at least one thermoplastic polymer.

20 Claims, 3 Drawing Sheets

3 in a pack

Window to Test

Easy Instructions

TEMPORARY CORRECTIVE OPTICAL LENSES

CROSS-REFERENCE TO RELATED APPLICATIONS

This patent application is a continuation of U.S. patent application Ser. No. 15/055,098, filed on Feb. 26, 2016 and entitled "Attachable Corrective Optical Lenses", which was a continuation-in-part of U.S. patent application Ser. No. 14/453,288, filed on Aug. 6, 2014 and entitled "Optical Lenses", which claimed the benefit of U.S. Provisional Patent Application Ser. No. 61/927,177 filed on Jan. 14, 2014 and entitled "Flexible Optical Lenses" and U.S. Provisional Patent Application Ser. No. 61/862,785 filed on Aug. 6, 2013 and entitled "Flexible Adhesive Optical Lenses", the disclosures of which are incorporated by reference herein in their entirety and made part of the present U.S. utility patent application for all purposes.

BACKGROUND OF THE INVENTION

The present invention relates in general to vision correcting and/or magnifying optical lenses, and more specifically to various flexible, adhesive, and non-adhesive films having predetermined optical characteristics and qualities that may be used as temporary or disposable "stick-on" lenses. These films or lenses may be removably applied to existing eyewear and may be dispensed from one or more dispensing systems or devices that store different strengths, shapes, and sizes of the removable lenses.

People wear many types of commercially available eye protection, eye coverings, and eyewear for purposes other than simply correcting or enhancing their vision. Eyewear and eye protection devices or items that do not typically provide optical magnification and/or optical correction characteristics include, for example, ski goggles, safety glasses or goggles such as those worn in manufacturing settings or at gun ranges, sunglasses, eyewear providing UV protection or shading the user's eyes from sunlight, swimming goggles, tanning protection goggles, welding masks, protective faceguards, surgical and medical eyewear, and other similar devices or items.

A large subset of the human population has difficulty reading printed materials and focusing on objects that are in close proximity to the eyes. To address this problem, simple and inexpensive reading glasses are commercially available at many retail locations including grocery stores and drug stores. Similarly, people also use prescription eyewear to improve distance vision. Both reading glasses and prescription glasses, as well as other forms of optical devices, provide optical magnification and/or correction and improved visual clarity to the users thereof. Such glasses often include plastic lens material having certain optical characteristics that provide these functions, and that are worn on the head when configured as traditional eyewear.

When a person is engaged in an activity in which protective, non-corrective eyewear is being used, circumstances often arise in which the user desires or is required to focus on small print or proximally close objects or, alternately, focus on distant objects. For example, a person may need to consult a printed map while skiing down a particular run with various forks in the path; a factory worker may need to consult design specifications, safety manuals, or other such materials during the use of heavy machinery; a person may wish to read a novel and/or check e-mails or text messages while engaging in various activities under direct sunlight; and/or a person may simply desire to be able to more clearly see road signs or other items while driving or walking on sunny days. Because non-corrective eyewear does not typically include corrective lenses, a person must remove the non-corrective eyewear and replace it with corrective glasses such as those previously described. Switching eyewear in this manner is often inconvenient and potentially exposes the person to the harm that the protective eyewear was intended to prevent. Accordingly, there is an ongoing need for corrective lenses that can be used in combination with various types of non-corrective protective eyewear and that can be easily mounted thereon and removed therefrom.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a first optical device is provided. This first optical device includes at least one temporary corrective optical lens adapted to be attachable to and detachable from a non-corrective optical lens, wherein the at least one corrective lens further comprises: at least one thermoplastic polymer having vision correcting or magnifying properties; and at least one non-phthalate plasticizer blended with the at least one thermoplastic polymer, wherein the corrective optical lens is attachable to the non-corrective optical lens by utilizing inherent van der Waals forces of attraction occurring between the corrective optical lens and the non-corrective optical lens, and wherein the inherent van der Waals forces of attraction are enhanced by blending the at least one non-phthalate plasticizer with the at least one thermoplastic polymer.

In accordance with another aspect of the present invention, a second optical device is provided. This second optical includes at least one temporary corrective optical lens adapted to be attachable to and detachable from a non-corrective optical lens, wherein the at least one corrective lens further comprises: at least one thermoplastic polymer having vision correcting or magnifying properties; and at least one non-phthalate plasticizer blended with the at least one thermoplastic polymer, wherein the weight percent of the at least one thermoplastic polymer in the blend is 35% to 95%, and wherein the weight percent of the at least one non-phthalate plasticizer in the blend is 5% to 65%, wherein the corrective optical lens is attachable to the non-corrective optical lens by utilizing inherent van der Waals forces of attraction occurring between the corrective optical lens and the non-corrective optical lens, and wherein the inherent van der Waals forces of attraction are enhanced by blending the at least one non-phthalate plasticizer with the at least one thermoplastic polymer.

In still another aspect of this invention, a method for making an optical device is provided. This method includes providing at least one thermoplastic polymer having vision correcting or magnifying properties; blending the at least one thermoplastic polymer with at least one non-phthalate plasticizer; forming a corrective optical lens from the blend of thermoplastic polymer and non-phthalate plasticizer, wherein the corrective optical lens is adapted to be attachable to a surface of a non-corrective optical lens by utilizing inherent van der Waals forces of attraction occurring between the corrective optical lens and the non-corrective optical lens, and wherein the inherent van der Waals forces of attraction between the corrective optical lens and the non-corrective optical lens are enhanced through the blending of the at least one non-phthalate plasticizer with the at least one thermoplastic polymer.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Exemplary embodiments of the present invention are now described with reference to the Figures. Although the following detailed description contains many specifics for purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

As previously stated, the present invention relates in general to vision correcting and/or magnifying optical lenses (referred to herein as "corrective optical lenses"), and more specifically to various flexible adhesive films having predetermined optical characteristics that may be used as attachable and detachable lenses on a variety of non-corrective substrates. These optical films or lenses may be removably applied to existing non-corrective eyewear and may be dispensed from one or more dispensing systems or devices that store different strengths, shapes and sizes of these removable lenses.

Figure 1:
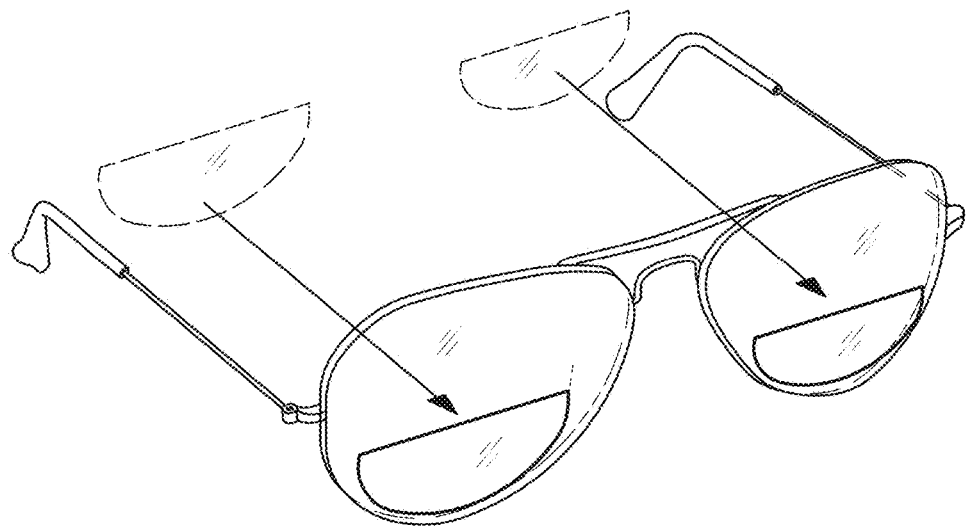
FIG. 1 is an exploded, perspective view of corrective optical lenses in accordance with an exemplary embodiment of the present invention, wherein the corrective optical lenses are used in combination with non-corrective sunglasses.
Figure 2B:
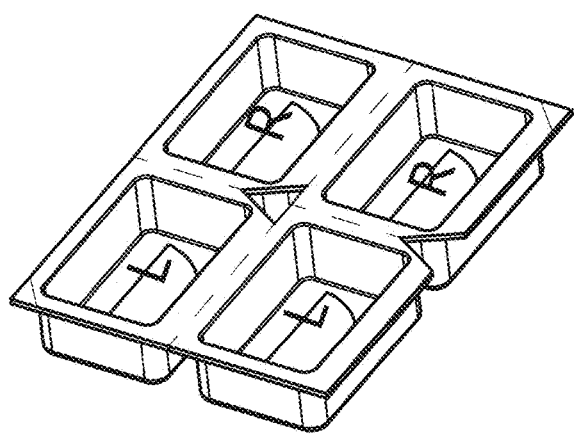
FIGS. 2a-c are illustrations of one packaging system that may be used with the present invention, wherein the corrective optical lenses are provided in a blister pack or other packaging material with a transparent backing for allowing users to try or test the corrective optical lenses without opening the packaging.
Figure 2C:
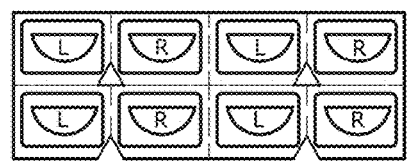
Figure 2A:
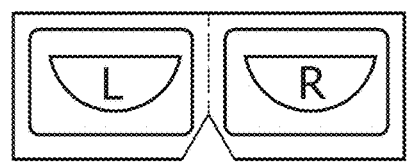
Figure 3:
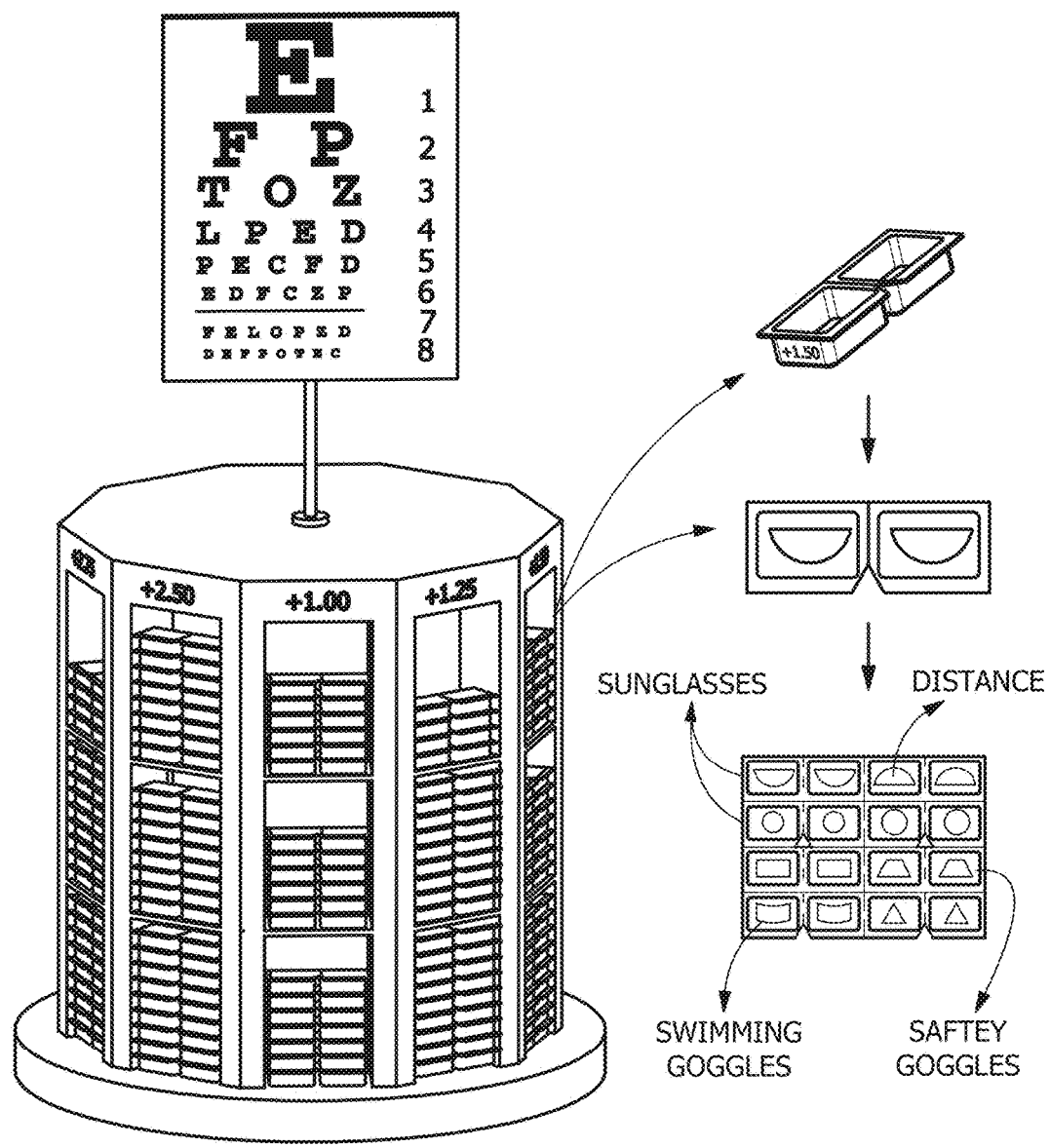
FIG. 3 is an illustration of a dispensing system that may be used with the present invention, wherein the corrective optical lenses are provided in a table top point of sale dispensing device.

With reference to the Figures, exemplary embodiments of this invention provide a system, device, and method for conferring optically corrective or vision correcting characteristics to eyewear that does not include or that is not intended to provide optically corrective characteristics or vision correcting properties. The system aspect of this invention typically includes protective eyewear that further includes at least one non-corrective lens and at least one corrective optical lens, wherein the at least one corrective optical lens is adapted to be removably mounted on the non-corrective lens. The at least one corrective optical lens may be mounted on either the inner or outer surface(s) of the non-corrective lens and may be removed and disposed of when the corrective optical lens becomes dirty or damaged. Certain embodiments of the corrective optical lenses of this invention typically include: (i) a thin, flexible film having predetermined or otherwise known or predictable optical characteristic; (ii) optionally, physical dimensions that correspond to a predetermined type of non-corrective eyewear; and (iii) at least one releasable (i.e., non-permanent) adhesive or adhesive-like material that is operative to securely attach the thin, flexible film to the non-corrective lens until removal of the thin, flexible film is desired. In certain other embodiments, non-adhesive attachment means are also an aspect of this invention. As shown in FIGS. 2-4, various dispensing devices for storing the corrective optical lenses prior to use are also an aspect of this invention.

Non-corrective eyewear that is compatible with the present invention includes, for example, sunglasses and UV protective glasses; ski goggles; goggles used at gun ranges; swimming goggles; tanning bed goggles, welding glasses; welding masks; protective facemasks; safety glasses; safety eyewear used in manufacturing environments, the military, and medical and surgical environments; and any other protective or accessorial eyewear used for any purpose that does not have vision correction and/or magnification characteristics.

The corrective optical lenses of the present invention include various optical materials that possess optical characteristics similar to those found in traditional reading or prescription lenses for glasses. These corrective optical lenses are provided in multiple forms and magnifications (e.g., +1.0 to +3.0 magnification) and/or correction strengths and are manufactured from materials such as acrylic, polycarbonate, elastomers, thermoplastics, and/or combinations thereof. Other polymers having known optical characteristics are compatible with this invention, such as those disclosed in U.S. Pat. No. 6,170,952, which is incorporated by reference herein, in its entirety, for all purposes. The optical materials may consist of a single or multiple laminates/layers of one or multiple combinations of the above-mentioned materials or other suitable materials. The optical materials may be fabricated in shapes and sizes that are pre-formed for compatibility with existing non-corrective eyewear lens configurations; however, in some embodiments, the users of this invention may also cut the corrective optical lenses to conform to desired shapes that are needed to cover all or portions of existing non-corrective eyewear. The optical materials of this invention may also be manufactured in different colors and may be suitable for printing graphics or text thereon without impairing performance of the lens.

In some embodiments of this invention, a removable adhesive backing is provided for use in applying the optical lens to existing eyewear. The adhesive material is transparent, non-distorting, and reusable, and exhibits good water resistance as well as the ability to withstand a wide range of temperatures. An adhesive release liner may include tabs or a similar mechanism to help a user hold and position the lenses before applying them in a desired position on their eyewear or eye protection device. The adhesive is typically pressure sensitive, medical grade, displays high performance features, and does not leave any residue when removed and reapplied. The following references, all of which are incorporated by reference herein for all purposes, include relevant technical disclosure with regard to adhesives-based systems that are compatible with some or all embodiments of this invention: U.S. Pat. Nos. 8,210,677; 8,164,835; 7,798,635; 7,733,575; 7,036,929; 5,748,279; 5,502,516; 5,478,824; 5,153,619; U.S. Patent Pub. No. 2012/0268838; and European Patent No. EP0640523. This invention includes the use of additional or alternate known adhesive-based attachment systems that are not specifically disclosed in these references.

In other embodiments of this invention, alternate attachment means are provided for use in applying the corrective optical lens to existing eyewear. Such alternate attachment means include electrostatic attachment systems (including those imparting an electrostatic charge on one or more materials to be joined together or otherwise connected); molecular surface adhesion attachment systems; friction or suction-based attachment systems; pressure adherable attachment systems (e.g., repositionable films); and physical or mechanical attachment systems (e.g., frames or other support structures; force-fitting, fusion of parts, welding, clamping, or other suitable fastening means). The following references, all of which are incorporated by reference herein for all purposes, include relevant technical disclosure with regard to non-adhesives-based systems that are compatible with some or all embodiments of this invention: U.S. Pat. Nos. 6,170,952; 6,003,990; 5,764,333; 5,677,751; 4,563,065; 3,904,281; 3,033,359; and International Publication No. WO 1995/016220. This invention contemplates the use of additional or alternate known non-adhesive-based attachment systems that are not specifically disclosed in the listed references.

In still other embodiments, the attachable corrective optical lenses of the present invention utilize the inherent molecular properties of thermoplastic polymers that have been blended, mixed, or formulated with non-phthalate plasticizers such as, for example: (i) terephthalate plasticizers; (ii) bio-based citrate plasticizers; (iii) bio-based soy plasticizers; or (iv) combinations thereof. These particular components/ingredients of the attachable corrective optical lenses optimize van der Waals forces of attraction between the corrective lenses and non-corrective lens substrates such as sunglasses, safety glasses, and the like. In physical chemistry, van der Waals forces (or van der Waals' interaction) are the residual attractive or repulsive forces that occur between molecules or atomic groups that do not arise from a covalent bond or electrostatic interaction. Such forces can be attractive or repulsive and are driven by induced electrical interactions between two or more atoms or molecules that are very close to each other. Van der Waals' interaction is typically a weak intermolecular attraction between molecules; however, with a large number of van der Waals forces interacting between two objects, the interaction can be very strong, especially in low weight structures with high surface areas.

Van der Waals forces are further defined as relatively weak electric forces that attract neutral molecules to one another in gases, in liquefied and solidified gases, and in almost all organic liquids and solids. Solids that are held together by van der Waals forces characteristically have lower melting points and are softer than those held together by the stronger ionic, covalent, and metallic bonds. Van der Waals forces may arise from three sources: dipole-dipole interactions; induced dipole interactions; and spontaneous dipole-induced dipole interactions. The molecules of some materials, although electrically neutral, may be permanent electric dipoles. Because of fixed distortion in the distribution of electric charge in the very structure of some molecules, one side of a molecule is always somewhat positive and the opposite side somewhat negative. The tendency of such permanent dipoles to align with each other results in a net attractive force. Alternately, the presence of molecules that are permanent dipoles may temporarily distort the electron charge in other nearby polar or nonpolar molecules, thereby inducing further polarization. An additional attractive force results from the interaction of a permanent dipole with a neighboring induced dipole. Finally, even though no molecules of a material are permanent dipoles (e.g., in the noble gas argon or the organic liquid benzene), a force of attraction exists between the molecules, accounting for condensing to the liquid state at sufficiently low temperatures.

A thermoplastic polymer is a type of plastic that changes properties when heated and cooled. Thermoplastics become soft when heat is applied and have a smooth, hard finish when cooled. There is a wide range of available thermoplastic formulas that have been created for many different applications. A thermoplastic polymer is made up of long, unlinked polymer molecules, generally with a high molecular weight. Because the molecular chains are unlinked, they rely on other interactions, such as dipole-dipole interactions, aromatic ring stacking, or van der Waals forces. Thermoplastics generally form a crystalline structure when cooled below a certain temperature, resulting in a smooth surface finish and significant structural strength. Above this temperature, thermoplastics are elastic. As the temperature increases, thermoplastics gradually soften, eventually melting. The material properties of a thermoplastic polymer can be adjusted to meet the needs of a specific application by blending the thermoplastic resin with other components. Plasticizers can be added to a thermoplastic polymer to keep the material flexible during and after processing. Plasticizers are thought to work primarily by embedding themselves between the chains of polymers, spacing them apart (increasing the "free volume") and thus significantly lowering the glass transition temperature for the plastic. The increased free volume within the thermoplastic polymer may increase polymer chain movement and, therefore, potentially increase the van der Waals forces contributed by the thermoplastic polymer.

Exemplary thermoplastic polymer groups used with the corrective optical lenses of present invention that provide substantial van der Waals forces include: (i) polyvinyl chlorides (PVCs); (ii) ethylene acid copolymers; (iii) cellulosic polymers or plastics; and (iv) combinations thereof. The main van der Waals forces in PVCs are dipole-induced dipole forces between chloride atoms and hydrogen atoms. Van der Waals forces in ethylene acid copolymers, such as ethylene/methacrylic acid (E/MAA) copolymer, arise from the double bonded oxygen atoms and hydroxyl atoms in carboxylic acid structures comprising the polymer backbone. Van der Waals forces in cellulosic polymers, such as cellulose acetate polymers and cellulose acetate propionate polymers, arise from the double bonded oxygen atoms in the ester groups comprising the polymer backbone. These same charges within the thermoplastic polymers support van der Waals interactions with non-corrective optical lenses such as the polycarbonate lenses typically used for sunglasses or borosilicate based-lenses. Specific examples of thermoplastic polymers suitable for use with the corrective optical lenses of present invention include, but are not limited to: (i) DuPont™ Surlyn® PC-2000 (ionomer of ethylene acid copolymer); (ii) DuPont™ Surlyn® 9970 (a thermoplastic resin that is an advanced ethylene/methacrylic (E/MAA) acid copolymer, in which MAA acid groups have been partially neutralized with zinc ions); (iii) Sylvin 9675-60 Clear 876 (a polyvinyl chloride thermoplastic polymer formulated with acetyl tributyl citrate plasticizer that is suitable for injection molding applications); (iv) Sylvin 9655-75 Clear 876 (a polyvinyl chloride thermoplastic polymer formulated with dioctyl terephthalate, a non-phthalate plasticizer, that is suitable for injection molding applications); or (v) combinations thereof or combinations of other suitable thermoplastic polymers. Also compatible with the present invention are Formosa Formolon® polyvinyl chloride resins; Shintech polyvinyl chloride resins; other DuPont™ Surlyn® resins, which are ionically cross-linked thermoplastics based upon ethylene copolymerised with carboxyl groups; Eastman Tenite® cellulose acetate propionate resins; and Eastman Tenite® cellulose acetate resins.

As will be appreciated by one of ordinary skill in the art, plasticizers are used almost exclusively as additives that increase the plasticity or fluidity of a material. Plasticizers typically include organic esters added to polymers to facilitate processing and to increase the flexibility and toughness of the final product by internal modification of the polymer molecule. Plasticizers are usually grouped into the following categories: phthalates, terephthalates, epoxy, aliphatics (mainly adipates and hydrogenated phthalates), trimellitates, used for sunglasses or borosilicate-based lenses. Specific examples of citrate plasticizers suitable for use with the corrective optical lenses of present invention include, but are not limited to: (i) triethyl citrate (TEC); (ii) acetyl triethyl citrate (ATEC); (iii) tributyl citrate (TBC); (iv) acetyl tributyl citrate (ATBC), particularly Junbunzlauer Citrofol® BII Acetyltributyl Citrate; (v) trioctyl citrate (TOC); (vi) acetyl trioctyl citrate (ATOC); (vii) trihexyl citrate (THC); (viii) acetyl trihexyl citrate (ATHC); (ix) butyryl trihexyl citrate (BTHC, trihexyl o-butyryl citrate); (x) trimethyl citrate (TMC); and (xi) combinations thereof or combinations of other suitable citrate polymers. Having generally described this invention, a further understanding can be obtained by reference to certain specific examples detailed below, which are provided for purposes of illustration only and are not intended to be all inclusive or limiting unless otherwise specified. Table 1 below, provides formulaic examples of thermoplastic polymers combined with non-phthalate-based plasticizers for use in manufacturing the corrective optical lenses of the present invention. In addition to the values shown in Table 1, in other embodiments, the weight percent of the at least one thermoplastic polymer in the blend is about 35% to about 95%, and the weight percent of the at least one non-phthalate plasticizer in the blend is about 5% to about 65%. In some embodiments, the weight percent of the non-phthalate plasticizer(s) in the blend is 5%-15% and in others it is 40%-50%, based on the specific thermoplastic polymer(s) being used. Higher plasticizer content is desired for maximizing van der Waals forces with the landing substrate, i.e., sunglasses, safety glasses, etc.

TABLE 1

Exemplary Formulation* for Corrective Optical Lenses

| | Polymer Formulation | Polymer Formulation Supplier | Thermoplastic Polymer Resin | Thermoplastic Polymer Resin Supplier | Plasticizer | Plasticizer Supplier | Plasticizer Class | Thermoplastic Polymer Weight % | Plasticizer Weight % |
|---|---|---|---|---|---|---|---|---|---|
| 1* | 9675-60 Clear 876 | Sylvin Technologies | PVC | Shintech or Formosa | Citrofol ® BII Acetyltributyl Citrate (ATBC) | Junbunzlauer | Citrate | 54% | 46% |
| 2 | 9655-60 Clear 876 | Sylvin Technologies | PVC | Shintech or Formosa | Dioctyl Terephthalate (DOTP) | Eastman Chemical or BASF | Terephthalate | 52.7% | 47.3% |
| 3 | 9655-75 Clear 876 | Sylvin Technologies | PVC | Shintech or Formosa | Dioctyl Terephthalate (DOTP) | Eastman Chemical or BASF | Terephthalate | 63% | 37% |
| 4 | 3200-60 Clear | Sylvin Technologies | PVC | Shintech or Formosa | Bio-Based Plasticizer | — | Bio-based | 53.6% | 46.4% |

*Calculated refractive index: 1.493 polymerics, phosphates, and bio-based plasticizers such as citrate plasticizers derived from citric acid (e.g., acetyl tributyl citrate (ATBC)), and soy-based plasticizers (e.g., epoxidized soybean oil). The citrate plasticizers incorporated into some embodiments of the present invention demonstrate unique characteristics and functionality with regard to providing an effective means for attaching the corrective optical lenses to non-corrective optical substrates. The citrate plasticizers used to manufacture the corrective optical lenses of the present invention include molecules formed by the esterification of citrate monomers and polymers. The van der Waals forces contributed by citrate plasticizers arise from the ester or carboxylic acid groups in the constituent molecules. The high concentration of double bonded oxygen atoms serves as a rich source of negatively charged electrons to support van der Waals' interactions with non-corrective optical lenses such as the polycarbonate lenses typically In addition to optimizing van der Waals forces of attraction between the corrective optical lens of the present invention and non-corrective substrate lenses and surfaces, non-phthalate plasticizers, and particularly citrate-based plasticizers, also provide the following advantages and benefits: (i) improved overall manufacturability; (ii) increased flexibility of finished lenses; (iii) reduced risk of causing 'crazing' in the non-corrective lenses to which the corrective optical lenses of the present invention have been attached; (iv) reduced environmental hazards; and (v) reduced toxicity and human health risks. Citrate plasticizers may also be used in medical, pharmaceutical, cosmetic and food applications.

The present invention is intended to address the needs of people with near sightedness (myopia), far sightedness (hyperopia), as well as people exhibiting both near and far sightedness. As such, this invention may be used by people using reading glasses; baby boomers who experience near sightedness due to age; people undergoing LASIK, PRK or other eye correction surgeries; as well as by people using prescription glasses for near vision and/or distance correction. This invention is relevant and applicable to various commercial markets, including: reading; sports; recreational and outdoor eyewear such as, for example, swimming, skiing, and shooting; professional and industrial markets such as, for example, welding, mining, and manufacturing; and/or any other environment that warrants protection of the eye from the surrounding elements. It may also be used in military applications for eye protection devices used in combat or other extreme environments or during training.

Figure 4A:
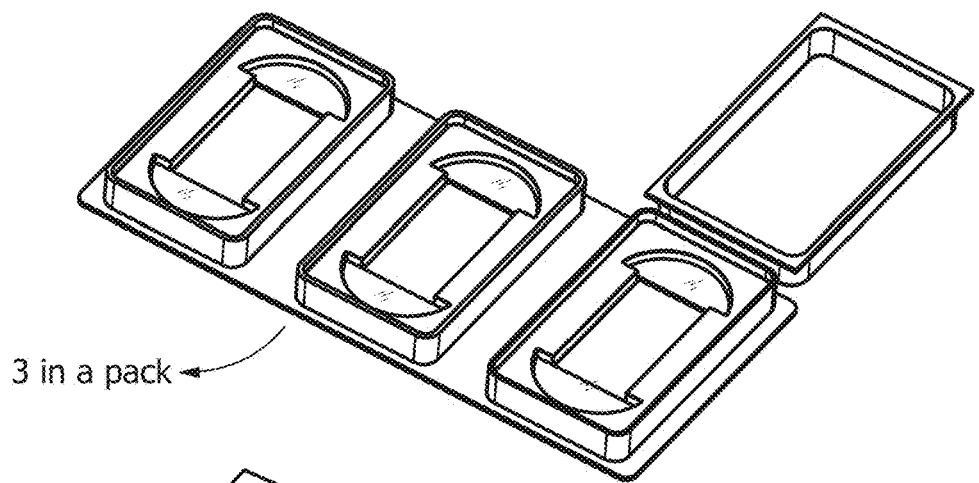
FIGS. 4a-c are illustrations of a dispensing system that may be used with the present invention, wherein the dispenser includes at least one window through which the corrective optical lens may be tested prior to purchase.
Figure 4B:
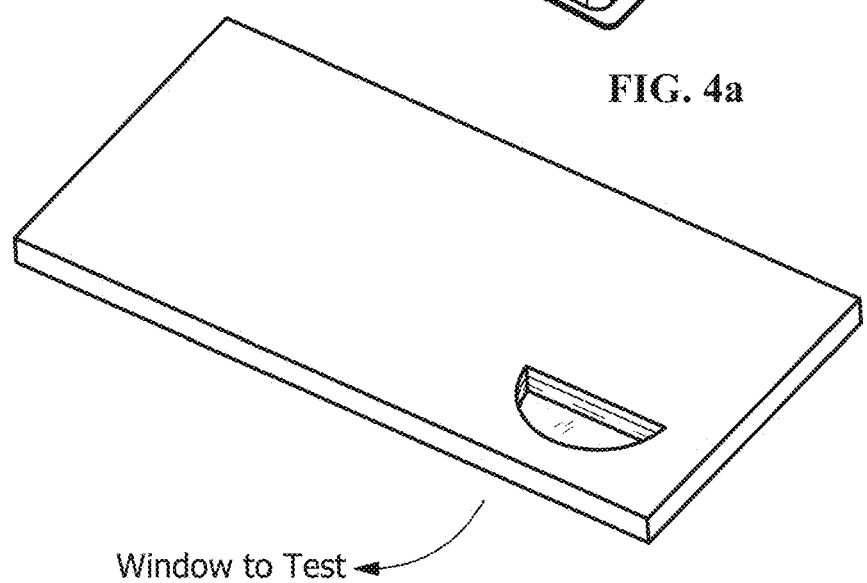
Figure 4C:
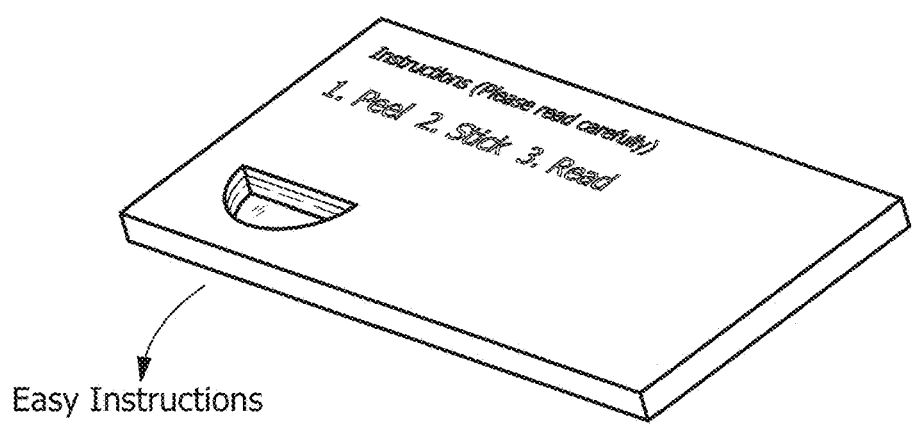

With reference to FIG. 2, the optical lenses of this invention may be packaged in a blister pack or any other packaging configuration having a transparent backing for allowing potential users to try the optical lenses without opening the packaging. The optical lenses may also be dispensed using a device that resembles and functions like a tape dispenser. With reference to FIG. 3, the dispenser may be a table top device holding numerous packs of corrective optical lenses with an eye chart on top for people to use in testing the lenses before buying a particular strength. The dispensing device(s) may also hold the corrective optical lenses in various sizes that have been pre-cut for certain applications such as those previously discussed. With reference to FIG. 4a-c, the corrective optical lenses of the present invention may be provided in a convenient three-pack (or other quantity), wherein the dispenser includes at least one window through which the optical lens may be tested prior to purchase (see FIG. 4b). The dispenser may also include instructions or other information printed thereon (see FIG. 4c).

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. An optical device, comprising:
   (a) at least one temporary corrective optical lens adapted to be attachable to and detachable from a non-corrective optical lens, wherein the at least one corrective lens further comprises:
      (i) at least one thermoplastic polymer having vision correcting or magnifying properties; and
      (ii) at least one non-phthalate plasticizer blended with the at least one thermoplastic polymer,
   (b) wherein the corrective optical lens is attachable to the non-corrective optical lens by utilizing inherent van der Waals forces of attraction occurring between the corrective optical lens and the non-corrective optical lens, and
   (c) wherein the inherent van der Waals forces of attraction are enhanced by blending the at least one non-phthalate plasticizer with the at least one thermoplastic polymer.

2. The device of claim 1, wherein the non-corrective optical lens is a polycarbonate lens or a borosilicate-based lens.

3. The device of claim 1, wherein the non-corrective optical lens is adapted to be used with sunglasses; UV protective glasses; ski goggles; shooting goggles; swimming goggles; tanning goggles, welding glasses; welding masks; protective facemasks; safety glasses; and safety eyewear used in manufacturing environments, the military, and medical and surgical environments.

4. The device of claim 1, wherein the at least one thermoplastic polymer is selected from the group consisting of: polyvinyl chlorides; ethylene acid copolymers; cellulosic polymers; and combinations thereof.

5. The device of claim 1, wherein the at least one non-phthalate plasticizer is selected from the group consisting of: terephthalate plasticizers; citrate plasticizers; soy plasticizers; and combinations thereof.

6. The device of claim 5, wherein the citrate plasticizer is selected from the group consisting of: triethyl citrate (TEC); acetyl triethyl citrate (ATEC); tributyl citrate (TBC); acetyl tributyl citrate (ATBC); trioctyl citrate (TOC); acetyl trioctyl citrate (ATOC); trihexyl citrate (THC); acetyl trihexyl citrate (ATHC); butyryl trihexyl citrate (BTHC); trimethyl citrate (TMC); and combinations thereof.

7. The device of claim 1, wherein the weight percent of the at least one thermoplastic polymer in the blend is 35% to 95%, and wherein the weight percent of the non-phthalate plasticizer in the blend is 5% to 65%.

8. The device of claim 1, wherein the weight percent of the at least one thermoplastic polymer in the blend is 54%, and wherein the weight percent of the non-phthalate plasticizer in the blend is 46%.

9. The device of claim 1, wherein the calculated refractive index of the at least one corrective optical lens is about 1.5.

10. An optical device, comprising:
    (a) at least one temporary corrective optical lens adapted to be attachable to and detachable from a non-corrective optical lens, wherein the at least one corrective lens further comprises:
       (i) at least one thermoplastic polymer having vision correcting or magnifying properties; and
       (ii) at least one non-phthalate plasticizer blended with the at least one thermoplastic polymer, wherein the weight percent of the at least one thermoplastic polymer in the blend is 35% to 95%, and wherein the weight percent of the at least one non-phthalate plasticizer in the blend is 5% to 65%,
    (b) wherein the corrective optical lens is attachable to the non-corrective optical lens by utilizing inherent van der Waals forces of attraction occurring between the corrective optical lens and the non-corrective optical lens, and
    (c) wherein the inherent van der Waals forces of attraction are enhanced by blending the at least one non-phthalate plasticizer with the at least one thermoplastic polymer.

11. The device of claim 10, wherein the non-corrective optical lens is a polycarbonate lens or a borosilicate-based lens.

12. The device of claim 10, wherein the non-corrective optical lens is adapted to be used with sunglasses; UV protective glasses; ski goggles; shooting goggles; swimming goggles; tanning goggles, welding glasses; welding masks; protective facemasks; safety glasses; and safety eyewear used in manufacturing environments, the military, and medical and surgical environments.

13. The device of claim 10, wherein the at least one thermoplastic polymer is selected from the group consisting of: polyvinyl chlorides; ethylene acid copolymers; cellulosic polymers; and combinations thereof.

14. The device of claim 10, wherein the at least one non-phthalate plasticizer is selected from the group consisting of: terephthalate plasticizers; citrate plasticizers; soy plasticizers; and combinations thereof.

15. The device of claim 14, wherein the citrate plasticizer is selected from the group consisting of: triethyl citrate (TEC); acetyl triethyl citrate (ATEC); tributyl citrate (TBC); acetyl tributyl citrate (ATBC); trioctyl citrate (TOC); acetyl trioctyl citrate (ATOC); trihexyl citrate (THC); acetyl trihexyl citrate (ATHC); butyryl trihexyl citrate (BTHC); trimethyl citrate (TMC); and combinations thereof.

16. The device of claim 10, wherein the calculated refractive index of the at least one corrective optical lens is about 1.5.

17. A method for making an optical device, comprising:
    (a) providing at least one thermoplastic polymer having vision correcting or magnifying properties;
    (b) blending the at least one thermoplastic polymer with at least one non-phthalate plasticizer;
    (c) forming a corrective optical lens from the blend of thermoplastic polymer and non-phthalate plasticizer,
    (d) wherein the corrective optical lens is adapted to be attachable to a surface of a non-corrective optical lens by utilizing inherent van der Waals forces of attraction occurring between the corrective optical lens and the non-corrective optical lens, and
    (e) wherein the inherent van der Waals forces of attraction between the corrective optical lens and the non-corrective optical lens are enhanced through the blending of the at least one non-phthalate plasticizer with the at least one thermoplastic polymer.

18. The method of claim 17, wherein the at least one thermoplastic polymer is selected from the group consisting of: polyvinyl chlorides; ethylene acid copolymers; cellulosic polymers; and combinations thereof, and wherein the at least one non-phthalate plasticizer is selected from the group consisting of terephthalate plasticizers; citrate plasticizers; soy plasticizers; and combinations thereof.

19. The method of claim 18, wherein the citrate plasticizer is selected from the group consisting of: triethyl citrate (TEC); acetyl triethyl citrate (ATEC); tributyl citrate (TBC); acetyl tributyl citrate (ATBC); trioctyl citrate (TOC); acetyl trioctyl citrate (ATOC); trihexyl citrate (THC); acetyl trihexyl citrate (ATHC); butyryl trihexyl citrate (BTHC); trimethyl citrate (TMC); and combinations thereof.

20. The method of claim 17, wherein the weight percent of the at least one thermoplastic polymer in the blend is 35% to 95%, and wherein the weight percent of the at least one non-phthalate plasticizer in the blend is 5% to 65%.

* * * * *